United States Patent [19]

Okada et al.

[11] Patent Number: 5,464,333
[45] Date of Patent: Nov. 7, 1995

[54] MAGNET PUMP WITH REAR THRUST BEARING MEMBER

[75] Inventors: Kazuo Okada, Kawagoe; Toshihiko Kondoh, Sayama, both of Japan

[73] Assignee: Iwaki Co., Ltd., Tokyo, Japan

[21] Appl. No.: 264,351

[22] Filed: Jun. 22, 1994

[30] Foreign Application Priority Data

Jun. 24, 1993 [JP] Japan .................. 5-040038 U

[51] Int. Cl.$^6$ ................................ F04B 17/00
[52] U.S. Cl. ................... 417/420; 417/423.12
[58] Field of Search ............... 417/420, 423.8, 417/423.12; 415/180

[56] References Cited

U.S. PATENT DOCUMENTS

| | | | |
|---|---|---|---|
| 3,354,833 | 11/1967 | Laing | 417/420 |
| 3,411,450 | 11/1968 | Clifton | 417/420 |
| 3,877,844 | 4/1975 | Klaus | 417/420 |
| 4,013,384 | 3/1977 | Oikawa | 417/420 |
| 4,036,565 | 7/1977 | Becker | 417/420 |
| 4,736,989 | 3/1988 | Laing | 417/420 |
| 4,822,256 | 4/1989 | Laing | 417/420 |
| 4,834,628 | 5/1989 | Laing | 417/420 |
| 4,874,300 | 10/1989 | Laing et al. | 417/420 |
| 5,160,246 | 11/1992 | Horiuchi | 417/229 |
| 5,253,986 | 10/1993 | Bond et al. | 417/423.12 |
| 5,302,091 | 4/1994 | Horiuchi | 417/423.12 |

FOREIGN PATENT DOCUMENTS

| | | |
|---|---|---|
| 0516509A1 | 12/1992 | European Pat. Off. . |
| 3520594A1 | 12/1986 | Germany . |
| 1134228 | 11/1968 | United Kingdom . |

OTHER PUBLICATIONS

Patent Abstracts of Japan, Kazuyoshi, vol. 6, No. 201 (M-163) 13 Oct. 1982, JP-A-57 108 492 (Hitachi Ltd.) 6 Jul. 1982.

*Primary Examiner*—Richard A. Bertsch
*Assistant Examiner*—Peter G. Korytnyk
*Attorney, Agent, or Firm*—Jones, Tullar & Cooper

[57] ABSTRACT

A rear thrust bearing member is disposed to be in frictional contact with an axial end face of a spindle supported in a cantilever fashion in the neighborhood of and on the rear side of an impeller. Frictional heat that is generated in this part is satisfactorily diffused with a cooling effect provided by the rotation of the impeller in the pump casing and a heat diffusion effect provided by the circulating effect. Thus, a temperature rise of the frictional portions is suppressed, and adverse effects of heat on the surrounding member are prevented.

7 Claims, 2 Drawing Sheets

MAGNET PUMP WITH REAR THRUST BEARING MEMBER

BACKGROUND OF THE INVENTION

This invention relates to a magnet pump, in which a magnet coupling between a drive and a driven magnet facing each other rotationally drives an impeller in a pump chamber for a pumping operation and, more particularly, to improvements in a front and a rear side thrust bearing, particularly the rear thrust bearing member for supporting the thrust acting on a driven rotor portion including an impeller.

A prior art magnetic pump of this type has a structure as shown, for instance, in FIG. 3. The well-known magnet pump 1 as shown in FIG. 3 comprises a front casing having a suction port 3 extending in the axial direction as shown by axis line X—X and a discharge port 4 extending circumferentially, an impeller 6 rotationally disposed in the pump chamber 2 and having a front side portion (i.e., right side in the Figure) facing the suction port 3, a cylindrical rear casing with a bottom cooperating with a front casing 5 to enclose the pump chamber 2 liquid tight, a driven rotor 10 disposed outside a rear casing 7, having a ring-like drive magnet 8 and receiving a rotational drive torque from a drive motor (not shown) disposed in a pump body 9, a driven rotor 12 disposed in the rear casing 7, having a ring-like driven magnet 11 facing and forming a magnet coupling with the drive magnet 8 via the rear casing and rotatable in unison with the impeller, and a spindle 14 secured at the distal end thereof to the bottom 7a of the rear casing 7 via an integral boss 13 projecting from the bottom 7a and having an extended end portion projecting axially for rotatably supporting the driven rotor 12 on the extended end portion via a sleeve-like bearing 15.

In the above well-known magnet pump 1, the rotation of the drive rotor 10 causes rotational driving of the driven rotor 12 to cause rotation of the impeller 6, thus causing fluid to be pumped to flow into the pump chamber 2 through the suction port 3 as shown by the arrow and be sent out through the discharge port 4 as shown by the arrow. In this pumping operation, the fluid in the pump chamber 2 partly flows as a circulating flow into the depth of the rear casing 7. In the circulating flow, the fluid flows into the frictional contact portions 15a defined between the sleeve-like bearing 15 integral with the driven rotor 12 and the spindle 14 from the rear end side of the bearing 15 as shown by dashed line arrows to come out to the front end side and pass through a central communication hole 16 provided in the impeller 6, thereby providing a cooling effect to suppress increased heat generation by the friction of the frictional contact portions 15a and also providing a lubricating action. In the frictional contact portions 15a, a fluid passage groove is formed, which is a helical groove or like a spline.

During the pumping operation, a negative pressure prevails on the front side of the impeller 6 that faces the suction port 3, while the driven rotor section including the driven rotor 12 and the impeller 6 normally receives a thrust in the direction toward the suction port 3, i.e., in the direction toward the front. Thus, ring-like front thrust bearing 17 is provided in the front casing 5 for supporting the thrust, and a mouth ring 18 provided on the side of the impeller 6 is in frictional contact with the front thrust bearing 17.

Further, a thrust may act on the driven rotor section in the direction opposite to the direction toward the suction port 3, i.e., in the rearward direction. This results from vibration of the driven rotor section in the thrust direction while the driven rotor portion remains rotating, which is caused when the pump is operated idly or abnormally due to trapping of air, or a like cause. Thus, a rear thrust bearing member 19 for supporting the rearward thrust acting on the driven rotor section is provided on a boss 13 around the spindle 14, so that the rear end of the sleeve-like bearing 15 is in frictional contact with the rear thrust bearing member 18 in the event of the generation of a rearward thrust.

As noted above, the sleeve-like bearing is brought to a state with its rear end in frictional contact with the rear thrust bearing member in the event of the idling operation of the pump or an abnormal operation thereof, such as air trapping. At this time, frictional heat is generated in the frictional contact portions, and this poses a problem. More specifically, the rear thrust bearing member, unlike the front thrust bearing member, is provided in the depth of the rear casing therefore, diffusion of the frictional heat is inferior, and when the temperature is increased, the bearing parts are seized. Particularly, where the rear casing or like enclosure member is a synthetic resin molding, the heat has an adverse effect of causing damage to these parts due to fusing. Further, when the rear end of the sleeve-like bearing is brought into frictional contact with the rear thrust bearing member, the circulating flow entering the frictional contact portions defined around the spindle generates heat and generate circulation failure, thus making the problem more significant.

To solve the problem, it has been proposed to provide a heat isolation structure adopting a heat insulating material such as to surround the frictional contact portions of the rear thrust bearing or the like. In this case, a cost increase due to the provision of the heat insulation structure is inevitable. In addition, since the heat insulation material prevents diffusion of heat, the frictional contact portions are quickly elevated in temperature even by a short period of idling, and what is commonly called heat shock is liable to be generated by priming fluid supplied into the pump chamber immediately afterwards.

SUMMARY OF THE INVENTION

An object of the present invention is to provide a magnet pump, which can greatly suppress frictional heat generation in the frictional contact portions in the event of generation of idling or like abnormal operation of the pump, has no need of providing any heat insulation structure around the frictional contact portions, permits use of a resin molding for the rear casing or like surrounding member, and permits durability improvement and cost reduction of the entire pump.

To attain the above object of the present invention, according to the present invention there is provided a magnet pump including a front casing defining an inner pump chamber and having an axially extending suction port and a circumferentially extending discharge port, an impeller rotatably disposed in the pump chamber, the impeller having a front side portion facing the suction port and a rear side portion opposite to the front side portion, a cylindrical rear casing with a bottom, cooperating with the front casing to enclose the pump chamber fluid tight, a drive rotor disposed outside the rear casing and having a drive magnet, a driven rotor having a driven magnet facing and forming a magnet coupling with the drive magnet and rotatable in unison with the impeller which is mounted on a front side portion of the driven rotor, a spindle secured to the rear casing, the spindle having an extended end portion axially projecting toward the suction port and rotatably supporting the driven rotor and the impeller thereon, and a rear thrust bearing member for supporting a rearward thrust acting on the driven rotor and the impeller in the direction opposite to the direction toward the suction port, in that the spindle has an axial end face at the extended end portion, and the rear thrust bearing member is disposed to be in frictional contact with the axial end face of the spindle.

Further, according to the present invention there is provided a magnet pump in which support means for supporting the rear thrust bearing member is provided on the rear side portion of the impeller or on the front side portion of the driven rotor.

Further, according to the present invention there is provided a magnet pump in which either one of the rear thrust bearing member and the axial end face of the spindle has a spherically shaped contact portion, and in which the spindle is fixed at the distal end thereof and projects in a cantilever fashion.

With the magnet pump with the rear thrust bearing member according to the present invention, the rear thrust bearing member is disposed such that it is capable of frictional contact with the axial end face of the spindle, and the support portion for supporting the rear thrust bearing member is provided on the rear side of the impeller, or on the front side of the driven rotor. Thus, when the driven rotor and the impeller are vibrated in the thrust direction while being moved in the rearward direction, the rear thrust bearing member is brought into contact with the axial end face of the spindle in the stationary state. The rear thrust bearing member, unlike the depth of the rear casing, is disposed on the back rear side in the neighborhood of the impeller. Thus, ready heat diffusion is obtainable. In addition, a cooling effect with stirring of the impeller in the pump casing is obtainable. Thus, the heat generated by the friction between the rear thrust bearing member and the axial end face of the spindle can be diffused satisfactorily, and the temperature rise of the frictionally movable part including the thrust bearing member can be suppressed. Further, since the flow path of the circulating flow passing between the spindle and the sleeve-like bearing is not blocked. Thus, a satisfactory cooling action around and lubricating action of the spindle can be maintained. Further, the circulating flow is provided to the rear thrust bearing member as well, and thus further satisfactory heat diffusion is obtainable.

Further, with the structure in which either one of the frictional contact portions of the axial end face of the spindle and the rear thrust bearing member is spherical in shape, the area of the frictional contact is reduced, and the heat generation can be reduced extremely. It is thus possible to permit a synthetic resin molding to be used as the rear casing or like surrounding member without the need of adopting a heat insulation structure or a like special measure. A magnet pump which is very durable and readily permits cost reduction, thus can be provided.

The above features and advantages of the present invention will be more fully understood from the detailed description of the preferred embodiments when the same is read with reference to the accompanying drawings.

DETAILED DESCRIPTION OF THE PREFERRED EMBODIMENTS

Figure 1:
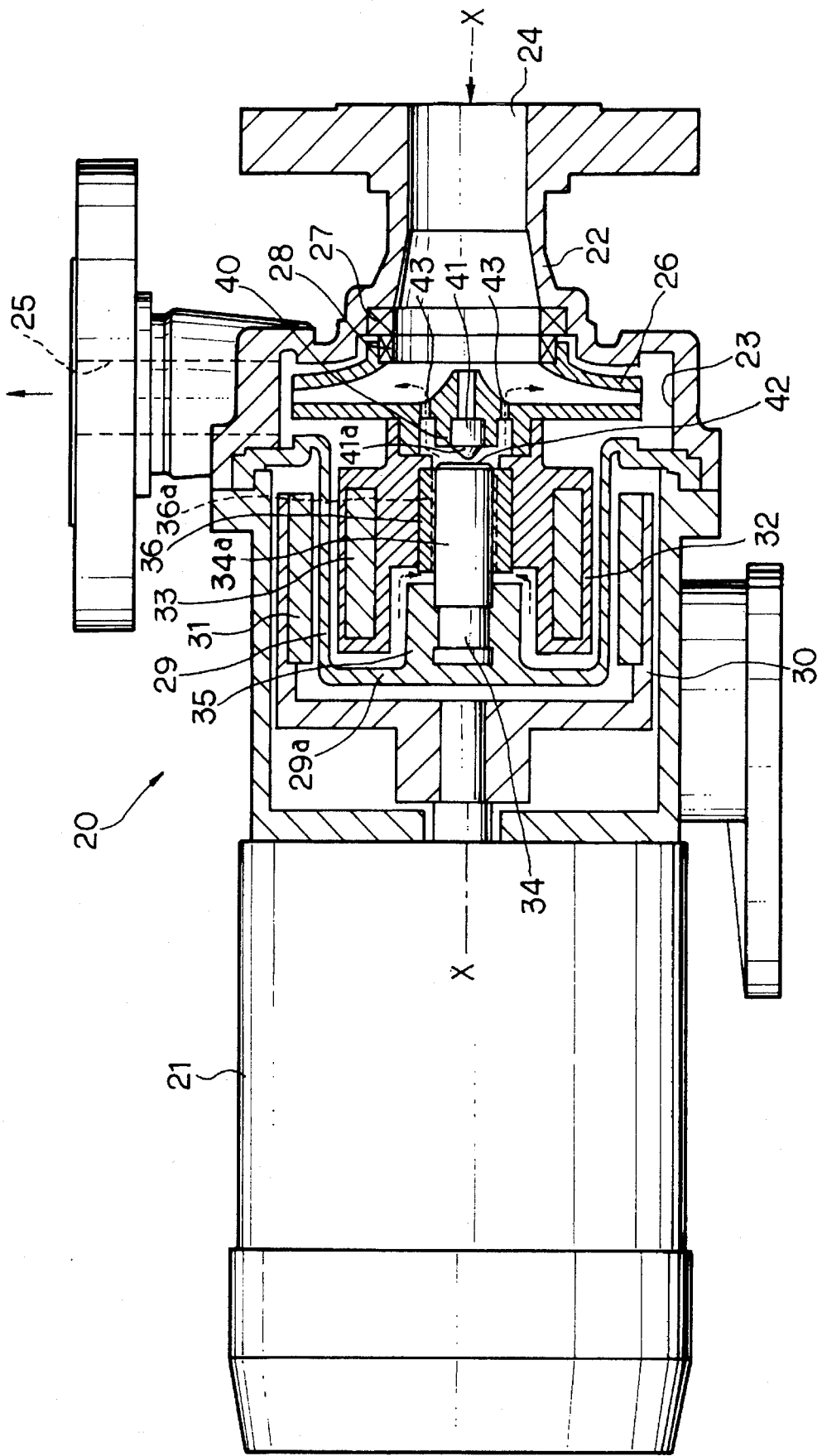
FIG. 1 is a view, partly in section, showing a magnet pump with a specific structure of a rear thrust bearing member embodying the present invention.

An embodiment of the magnet pump will be described with reference to FIGS. 1 and 2. FIG. 1 shows a magnet pump 20, having a pump body 21 accommodating an internal drive motor (not shown). A front casing 22, which is mounted on the pump body, defines an inner pump chamber 23 and a suction port 24 extending in an axial direction along axis X—X, and a circumferentially extending discharge port 25. An impeller 26 is rotatably disposed in the pump chamber 23 and has a front side (right side in the Figure) facing the suction port 24. A ring-like front thrust bearing member 27 is provided in the front casing 22 which is in frictional contact with a mouth ring 28 provided on the impeller 26. A cylindrical rear casing 29 with a bottom, is assembled in the pump body 21 and cooperates with the front casing 22 to enclose the pump chamber 23 fluid tight. A drive motor 30 is disposed outside the rear casing 29, and has a ring-like drive magnet 31 which receives rotational drive torque from the drive motor in the pump body 21. A driven rotor 32 is disposed in the rear casing 29, having a ring-like driven magnet 33 facing and forming a magnetic coupling with the drive magnet 31 via the rear casing 29 and rotatable in unison with the impeller 26. A spindle 34 is fixed to the bottom 29a of the rear casing 29 at the distal end thereof by a boss 35 integral with and projecting from the bottom 29a and has an extended end portion 34a extending axially in a cantilever fashion.

The driven rotor 32 is rotatably supported on the extended end portion 34a of the spindle 34 via a sleeve-like bearing 36. The bearing 36 is secured to the driven rotor 32 and has its frictional portion with respect to the spindle 34 formed with a flow groove or in the form of splines. During pumping fluid in the chamber 23 partly flows as a circulating flow into the depth of the rear casing 29, and as shown by the dashed line arrows it enters between the frictional contact portions 36a from the rear end of the bearing 36 to provide a cooling effect and lubricating effect.

At the start of the pumping operation, the drive rotor 30 is rotated with energization of the drive motor, thus causing rotation of the driven rotor 32 on the spindle 34 in unison with the impeller 26. As a result, fluid to be pumped flows through the suction port 24 into the pump chamber 23 as shown by the arrow to be fed out through the discharge port 25 to a destination portion (not shown).

Figure 3:
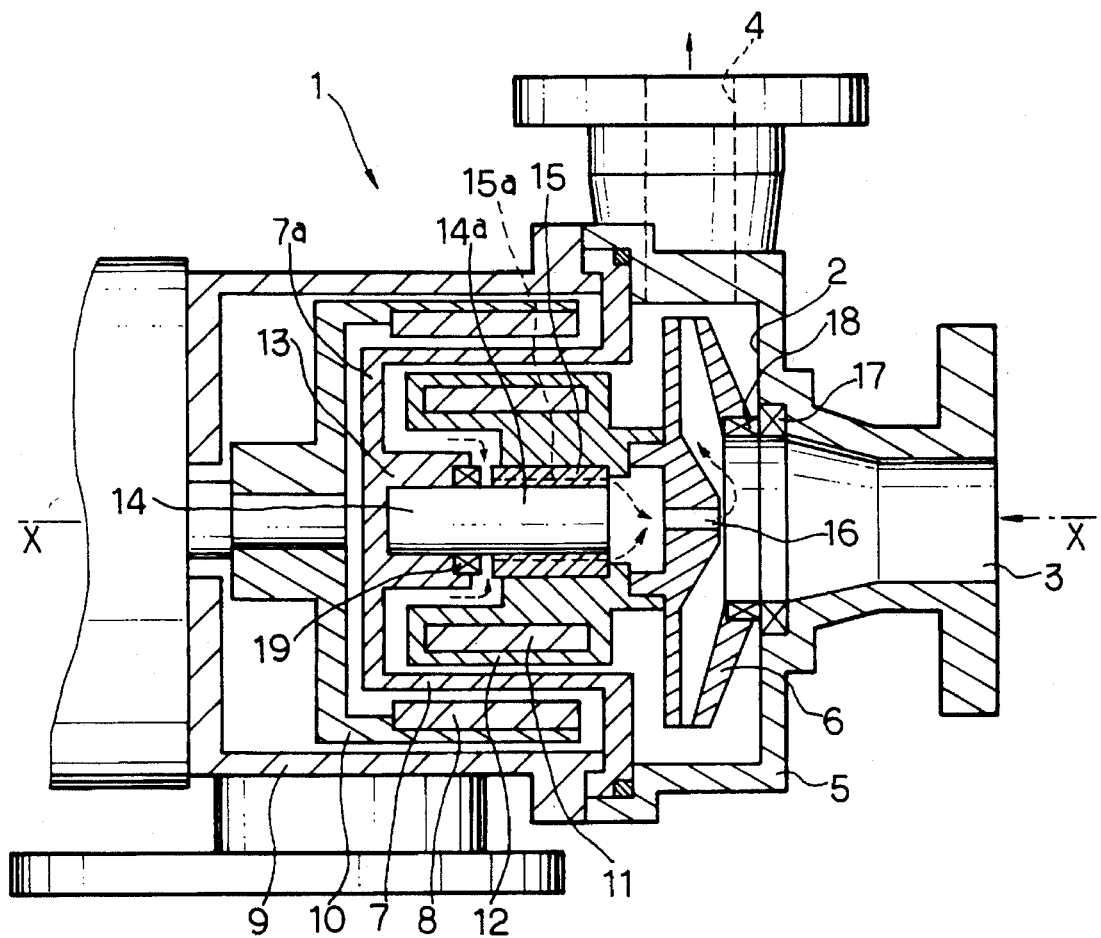
FIG. 3 is a fragmentary sectional view showing a magnet pump with a rear thrust bearing member of a prior art structure.

The structure part of the magnet pump described above is the same as the prior art structure described earlier with reference to FIG. 3. As for the materials of the various parts, the impeller 26, the rear casing 29 and the driven rotor 32 are fabricated from a synthetic resin as synthetic resin moldings. The sleeve-like bearing 36, the front thrust bearing member 27, the mouth ring 28 and the spindle 35 are desirably manufactured by using ceramic materials excellent in corrosion resistance, hardness, etc.

In the embodiment of the magnet pump shown in FIG. 1, a structural part relating to the rear thrust bearing member as a feature of the present invention will now be described. On the back side or rear side of the impeller 26 opposite the front side facing the suction port 24, the back center of the impeller 26 has an integral boss-like support 40, which supports a rear thrust bearing member 41 projecting along the axis line X—X. The rear thrust bearing member 41 extending from the support 40 has a spherically shaped frictional contact portion 41a as shown, which faces a flat axial end face 42 of the spindle 34. The impeller 26 has communication holes 43 for circulating the fluid to be pumped. Each communication hole 43 is formed from each side of a central portion of the impeller 26 since the rear thrust bearing member 41 is disposed on the central portion.

In the above construction, during the steady-state operation of the pump, the driven rotor 32 together with the impeller 26 receives a thrust directed in the direction toward the front of the pump, thus, it is rotated in a state that the mouth ring 28 is brought into frictional contact with the front thrust bearing member 27. During this time, the rear thrust bearing member 41 is out of contact with the axial end face 42 of the spindle. However, when the driven rotor part is caused to undergo vibrations in the axial direction and receives a rearward thrust due to such cause as idling of the pump or trapping of air, the frictional contact portion 41a of the rear thrust bearing member 41 is brought into contact with the axial end face 42 of the extended end portion 34a of the spindle 34, thus receiving a rearward thrust. As the driven rotor part continues to rotate in this contact state, frictional heat is generated in the frictional contact portions 41a. However, the place where the generation of the frictional heat is located is not in the depth of the rear casing 29 as in the prior art structure, but is found in the neighborhood of and right after the rear side of the impeller 26. Thus, the cooling effect due to rotation of the impeller 26 in the front casing 22 can be readily received. It is thus possible to obtain satisfactory heat diffusion of the frictional heat and suppression of the temperature rise around the frictional portions.

Further, with the frictional contact portion 41a of the rear thrust bearing member 41 made to be spherical in shape, the area of frictional contact with the axial end face of the spindle is reduced, and thus it is possible to further suppress heat generation in that locality.

Further, unlike the prior art structure, no rear thrust bearing member is provided between the rear end of the sleeve-like bearing 36 and the boss 35, and a gap is maintained therebetween at all times even with the rear thrust bearing member 41 in contact with the axial end face of the spindle 34. Thus, as shown by the dashed line arrows, the fluid that reaches the depth of the rear casing 29 flows as a circulating flow between the frictional portions 36a from the rear end of the bearing 36, comes out from the front end and passes through the communication holes 43 formed in the impeller 26. Thus, the cooling action and lubricating action between the sleeve-like bearing 36 and spindle 34 is satisfactory at all times, thus precluding the possibility of seizure or damage to these parts. Further, since the circulating flow is provided around the rear thrust bearing member 41, heat diffusion is further promoted.

Figure 2:
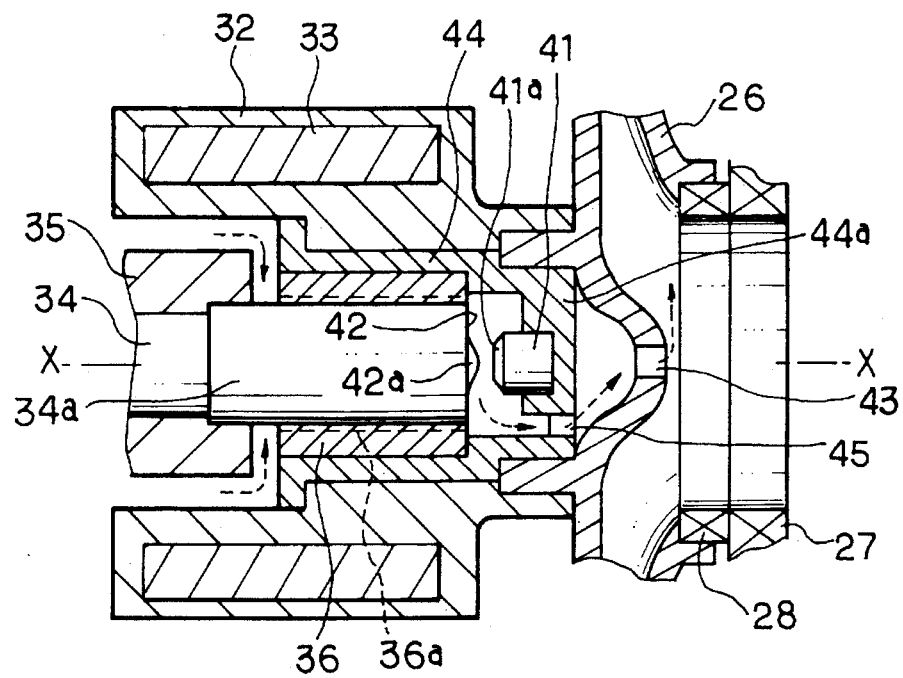
FIG. 2 is a fragmentary enlarged-scale sectional view of a magnetic pump concerning a modification structure of the rear thrust bearing member according to the present invention.

FIG. 2 shows a modification structure of the rear thrust bearing member shown in the embodiment of FIG. 1. In FIG. 2, parts like those in FIG. 1 are designated by like reference numerals. In this modified structure, a support portion for supporting the rear thrust bearing member 41 is provided, in lieu of providing it on the impeller 26, on an intermediate member 44 forming the front side. The intermediate member 44 constitutes a part of the driven rotor 32. Specifically, the intermediate member 44 is cylindrical and has a front portion 44a, and it is secured to the outer periphery part of the sleeve-like bearing 36, with its front portion 44a located between the axial end face 42 of the spindle 35 and the rear side of the impeller 26. The bottom 44a serves as the support portion, to which the rear thrust bearing member 41 is secured.

In the above modified structure, the frictional contact portion 41a of the rear thrust bearing member 41 has a flat surface shape, whereas the axial end face 42 is provided with a frictional contact portion 42a having a spherical shape. With the provision of the spherical frictional contact portion on one of the mutually frictional contact portions, the above effect is obtainable. However, with the frictional contact portions both having flat surfaces, an effect which is not obtainable in the prior art is obtainable. Thus, the structure, in which the frictional portions are spherical in shape, is not limitative.

The bottom 44a of the intermediate member 44 has a communication hole 45, which is communicated with a communication hole 43 and which is formed in the central portion of the impeller 26. The circulating flow which gets out of the frictional parts 36a of the sleeve-like bearing 36 is circulated as shown by the dashed line, whereby the frictional heat generated in the rear thrust bearing member 41 is more satisfactorily diffused.

While the embodiment of the present invention and the modified structure thereof have been described in the foregoing, they are by no means limitative of the present invention.

What is claimed is:

1. A magnet pump, comprising:

a front casing defining an inner pump chamber and having an axially extending suction port and a circumferentially extending discharge port;

an impeller rotatably mounted in the pump chamber, the impeller having a front side portion and a rear side portion opposite to the front side portion, said front side portion facing the suction port;

a cylindrical rear casing cooperating with the front casing to enclose the inner pump chamber fluid tight;

a drive rotor mounted outside the rear casing and having a drive magnet;

a driven rotor having a front side portion on which the impeller is mounted, and a driven magnet facing and forming a magnetic coupling with the drive magnet and rotatable in unison with the impeller;

a spindle secured to the rear casing, said spindle having an extended end portion axially projecting toward the suction port and supporting the driven rotor and the impeller rotatably thereon and movable in the axial direction thereof; and a rear thrust bearing member for supporting a rearward thrust which acts on the driven rotor and the impeller in a direction opposite to the direction facing the suction port, wherein said spindle having an axial end face at the extended end portion, and said rear thrust bearing member being disposed to be in frictional contact with said axial end face of the spindle in the event of at least one of an idling operation of the pump and an abnormal operation thereof.

2. The magnet pump according to claim 1, further comprising: support means for supporting said rear thrust bearing member on said rear side portion of the impeller.

3. The magnet pump according to claim 2, wherein at least one of said rear thrust bearing member and the axial end face of the spindle has a spherically shaped contact portion.

4. The magnet pump according to claim 3, wherein the spindle is fixed at the distal end thereof and projects in a cantilever fashion.

5. The magnet pump according to claim 1, further comprising: support means for supporting said rear thrust bearing member on said front side portion of the driven rotor.

6. The magnet pump according to claim 5, wherein at least one of said rear thrust bearing member and the axial end face of the spindle has a spherical shaped contact portion.

7. The magnet pump according to claim 6, wherein the spindle is fixed at the distal end thereof and projects in a cantilever fashion.

* * * * *